April 14, 1970 M. SIDDALL 3,506,312
CONTROL VALVE FOR HYDRAULIC FLUIDS
Original Filed May 29, 1967
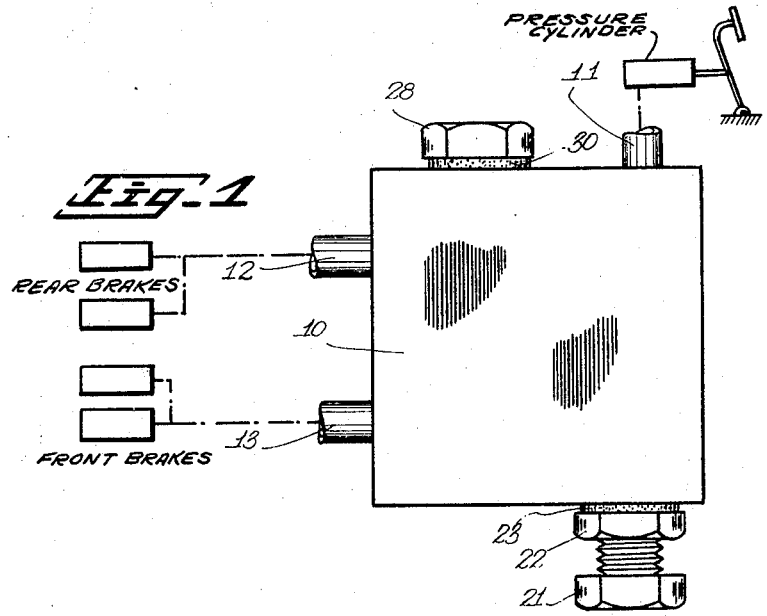
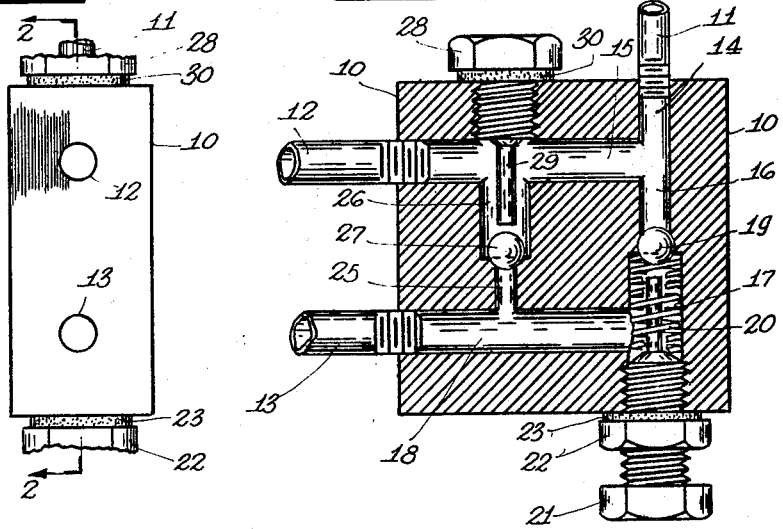

3,506,312
CONTROL VALVE FOR HYDRAULIC FLUIDS
Matthew Siddall, Hyway 39, Macoun,
Saskatchewan, Canada
Substituted for abandoned application Ser. No. 642,045, May 29, 1967. This application June 14, 1968, Ser. No. 747,406
Int. Cl. B60t *8/26*
U.S. Cl. 303—6             4 Claims

ABSTRACT OF THE DISCLOSURE

A hydraulic control valve for regulating, and controlling, the pressure fluid supply from a supply source, for initial application to a first pressure fluid operated installation, and subsequently to a second pressure fluid operated installation, on the pressure to the first installation reaching a predetermined value.

BACKGROUND OF THE INVENTION

Field of the invention

The invention is concerned with hydraulic control valves for insertion in a hydraulic installation in which a pressure fluid is fed to two pressure fluid operated devices, so that pressure fluid is applied to one of the devices for operation thereof at a first, lower, pressure value, and then on the pressure supply value to the device reaching a predetermined value, applies the pressure fluid to the second device. A particular field of application is for hydraulically operated brakes for automotive vehicles, where the rear wheel braking can be applied first and then the front wheel braking applied on continued operation of the brake pedal.

Description of the prior art

Previous arrangements fall generally into two forms. One form provides a double chamber cylinder in which a first piston operates in a first chamber, to provide a first pressure output, and then, on the output reaching a predetermined pressure, a second piston operates in a second chamber to produce an output of higher value. The two chambers may be connected independently to two separate pressure fluid operated systems, or valves for controlling the supply to the two systems may be provided. Another form provides some type of restrictor in the supply line to one of the fluid pressure operated systems. The restrictor may comprise only a flow restrictor such as an orifice, or the restrictor may be a valve which permits flow only when a predetermined pressure arises. Various modifications of these systems are available. The various known arrangements are more complex than the present invention, have more moving parts and require more accurate manufacture.

SUMMARY

The invention relates to a control valve for hydraulic fluids which will permit direct flow from a pressure source to a first pressure outlet, and which will permit a flow from the pressure source to a second pressure outlet when the pressure at the first outlet reaches a predetermined value. The control is obtained without the provision of additional pistons and associated cylinders, with the accompanying requirement of accurate manufacture. The valve is extremely simple, strong and does not require a high standard of manufacture. Essentially the control valve comprises a housing having a pressure inlet and first and second pressure outlets. One of the pressure outlets, the first, is connected directly to the pressure inlet by a conduit or passageway in the housing. The other, or second, pressure outlet is also connected to the pressure inlet by a conduit or passageway in the housing, but there is a valve in the conduit or passageway to the second pressure outlet. The valve is biased to a closed position preventing flow to the second outlet but opens to permit flow thereto when the pressure in the conduit or passageway to the first outlet rises to a predetermined value.

BRIEF DESCRIPTION OF THE DRAWINGS

FIGURE 1 is a side elevation of the control valve,
FIGURE 2 is a cross-section on the line 2—2 of FIGURE 3, and
FIGURE 3 is an end elevation.

DESCRIPTION OF THE PREFERRED EMBODIMENT

The control valve comprises a housing 10, with a pressure inlet 11 and two pressure outlets 12 and 13. In an existing brake system, the control valve is installed in place of the junction bar or similar device normally installed where the front and rear brake fluid lines come together. The pressure inlet 11 is connected to the pressure supply line from the brake master cylinder (not shown). The pressure outlets 12 and 13 are connected to rear and front brake systems respectively.

Considering now particularly FIGURE 2, it will be seen that the pressure inlet 11 is connected directly to the pressure outlet 12, by conduits 14 and 15 in the housing 10. Thus there is direct connection between the brake master cylinder and the rear brakes.

A further conduit 16 extends to a chamber 17, which chamber is connected to pressure outlet 13 by a further conduit 18. Access from the conduit 16 to the chamber 17 is controlled by a valve comprising a ball 19 held in position by a spring 20. The pressure exerted by the spring 20 on the ball 19 is controllably varied by an adjusting screw 21 which is locked in the desired position by locknut 22. A gasket 23 can be positioned between locknut 22 and housing 10 to prevent leakage. A stem 24 can be provided on the inner end of the adjusting screw 21 to limit movement of the ball 19.

The conduits 15 and 18 are interconnected by a bypass comprising a drilling 25, chamber 26 and a ball 27. Normally the ball 27 is seated on the outlet of the drilling 25 into the chamber 26 and acts as a one-way by-pass valve. To restrict movement of the ball 27, a screw 28 is positioned in the housing 10, the screw having a stem 29 extending into the chamber 26. A gasket 30 may be provided between the head of the screw 28 and the housing 10, to prevent leakage. Normally the housing is installed so that the ball 27 seats on the outlet of the drilling 25 gravitationally.

Operation of the control valve is as follows. On operation of the brake system, as by operation of a brake pedal, fluid pressure from the master cylinder is applied to the control valve via pressure inlet 11. A flow of pressure fluid to the rear brakes occurs via conduits 14 and 15 and pressure outlet 12. Initially the pressure in conduit 14 is not sufficient to displace ball 19. Therefore no flow to the front brakes occurs. If only slight or gentle braking is required, the pressure of the fluid in conduit 14 may remain below the pressure necessary to displace ball 19.

On increased braking effort, the pressure in conduit 14, and to the rear brakes, increases. Eventually the pressure builds up to a value which produces displacement of the ball 19 and flow of pressure fluid to the front brakes takes place, through conduit 16, chamber 17, conduit 18 and pressure outlet 13. Increased actuation of the brake pedal will increase braking effort on both front and rear wheels.

On release of the braking system, as by release of the brake lever, the pressure in the rear brake cylinders, and conduit 15 decreases and ball 27 is unseated. This lets the fluid flow from the front brakes and thus all brakes are released.

It will be seen that the invention enables the rear brakes to be applied first, and, if desired, only the rear brakes need be applied if only light braking is necessary. This improves stability of a vehicle, particularly when cornering, and also improves steering on good or bad road surfaces.

Also, if a fault occurs in the front brake system, such as a broken fluid line, or a leak, it is still possible to apply the rear brakes, although to a limited degree.

Conversely, with a fault occurring in the rear brake system, it is not possible to apply front braking only. Application of front braking only, particularly if severe, is very dangerous.

It will be appreciated that alternatives to the balls 19 and 27 can readily be provided, although balls are a very simple and effective form of valve.

Also, while the invention has been described in relation to braking systems, particularly to automotive vehicles, the invention is also applicable to other uses, where the sequential control of fluid pressure flow is required.

I claim:

1. In a hydraulic brake system for a motorized vehicle having front and rear braking systems, a control valve, comprising; a housing; a pressure inlet to the housing; means connecting the pressure inlet to a brake fluid pressurizing cylinder; a first and a second pressure outlet from the housing; means connecting the first pressure outlet to the rear brake system; means connecting the second pressure outlet to the front brake system; a first conduit in said housing directly connecting said pressure inlet to said first pressure outlet; a second conduit in said housing connecting said pressure inlet to said second pressure outlet; a valve chamber formed in the second conduit intermediate the ends and having an inlet and an outlet; and a valve in the second conduit, said valve consisting of a solid valve member movable axially in said chamber; a static valve seat at the inlet of the valve chamber and spring means resiliently urging the valve member towards the valve seat to a closed condition in sealing contact with said valve seat; the fluid pressure at said pressure inlet acting directly on said valve member; said valve member so constructed and arranged so as to be moved from its closed position by the pressure of fluid at said pressure inlet to the housing when said pressure reaches a predetermined value, to permit flow of pressure fluid into and through said chamber to said second pressure outlet; whereby the rear brake system is activated prior to and independently of the front brake system; and a by-pass connected between the first and second conduits, downstream of the control valve, said by-pass including a one-way valve to prevent flow from the first conduit to the second conduit and to permit flow from the second conduit to the first conduit on reduction of pressure in the first conduit below the pressure in the second conduit, to release the braking systems.

2. Apparatus as claimed in claim 1 including means for varying the bias on the valve member to vary said predetermined pressure rise.

3. Apparatus as claimed in claim 1, said valve member comprising a spring loaded ball.

4. Apparatus as claimed in claim 1 wherein the one-way valve comprises a ball gravitationally urged to a closed position.

References Cited

UNITED STATES PATENTS

| | | | |
|---|---|---|---|
| 2,460,774 | 2/1949 | Trautman | 137—101 |
| 2,805,737 | 9/1957 | Griffin. | |
| 2,844,161 | 7/1958 | Ostwald | 188—152 X |
| 3,304,130 | 2/1967 | Doerfler | 303—6 |

FOREIGN PATENTS

| | | |
|---|---|---|
| 943,931 | 6/1956 | Germany. |
| 1,091,265 | 10/1954 | France. |

MILTON BUCHLER, Primary Examiner

J. J. McLAUGHLIN, JR., Assistant Examiner

U.S. Cl. X.R.

60—54.5; 137—512.1, 599.1; 188—152; 303—84